United States Patent [19]

Asano et al.

[11] Patent Number: 5,459,772

[45] Date of Patent: Oct. 17, 1995

[54] EXTERNAL APPARATUS FOR MONITORING A COMMUNICATION SYSTEM

[75] Inventors: Mitsuyo Asano; Masatoshi Kumagai, both of Kawasaki, Japan

[73] Assignee: Fujitsu Limited, Kawasaki, Japan

[21] Appl. No.: 281,157

[22] Filed: Jul. 27, 1994

Related U.S. Application Data

[63] Continuation of Ser. No. 854,573, Mar. 20, 1992, abandoned.

[30] Foreign Application Priority Data

Mar. 20, 1991 [JP] Japan ..................... 3-057129

[51] Int. Cl.⁶ .................. H04M 1/21; H04M 3/08; H04M 3/22; H04J 1/16
[52] U.S. Cl. .................. 379/5; 379/16; 379/32; 379/34; 370/13; 370/15
[58] Field of Search .................. 379/5, 6, 16, 24, 379/26, 27, 32, 34, 269; 370/13, 15; 371/20.1, 20.5

[56] References Cited

U.S. PATENT DOCUMENTS

| 4,086,446 | 4/1978 | Taylor ........................ 379/32 |
|---|---|---|
| 4,421,955 | 12/1983 | Mori et al. .................. 379/269 |
| 4,661,971 | 4/1987 | Nemchek .................. 379/22 X |
| 4,860,281 | 8/1989 | Finley et al. .................. 379/5 X |
| 4,864,598 | 9/1989 | Lynch et al. .................. 379/32 X |
| 5,018,184 | 5/1991 | Abrams et al. .................. 379/6 X |
| 5,049,873 | 9/1991 | Robins et al. .................. 379/32 |

Primary Examiner—Stephen Chin
Assistant Examiner—Paul Loomis
Attorney, Agent, or Firm—Staas & Halsey

[57] ABSTRACT

An external monitoring system operating for a communication system comprising a common channel signaling unit for separating a message communication function from a communication function and for transmitting a data communication signal through an exclusive line, a signal processing unit for processing the communication using the common channel signaling unit, and an alarm processing unit for generating an alarm signal when an abnormal condition has arisen in the communication associated with the common channel signal processing unit, the alarm processing unit includes an external communication monitoring unit for monitoring an abnormal condition in communication control by the signal processing unit.

9 Claims, 8 Drawing Sheets

EXTERNAL APPARATUS FOR MONITORING A COMMUNICATION SYSTEM

This application is a continuation of application Ser. No. 07/854,573, filed Mar. 20, 1992, now abandoned.

BACKGROUND OF THE INVENTION

1. Field of the Invention

The present invention relates to an external apparatus for monitoring a communication system, and, more particularly to an external apparatus for monitoring a communication system for confirming a normal operation of a signaling processor for performing a communication process instead of a calling process.

2. Description of the Related Art

Various monitoring methods have been proposed for monitoring whether a communication software of a conventional exchange system is operating normally.

FIG. 1 (PRIOR ART) shows an example of a monitoring apparatus for monitoring the operation of a communication software of a conventional exchange system.

In FIG. 1, 1 designates an exchange network (called NW hereinafter), and exchange network NW 1 is connected to a calling processor (called CPR hereinafter) 2 subjected to an external monitoring.

3 designates an external monitoring apparatus comprising quasi-incoming trunks (called QICTs hereinafter) 4 and quasi-outputgoing trunks (called QOGTs hereinafter) 5.

Now, the operation of the above structure is explained. The external monitoring apparatus instructs the QICT 4 to start its examination in units of the predetermined intervals, in order to detect any abnormality. When the QICT 4 in the ESE 3 sends a quasi-call to NW 1 in accordance with the above instruction, the CPR 2 detects the quasi-call and enables the QOGT 5 in the ESE 3 to receive it. The monitoring of the CPR 2 is performed by repeating the quasi-outgoing call and the quasi-incoming call a discretional number of times, for example, two or three times sequentially at the predetermined intervals.

The NW 1 processes the quasi-call in the same way as an ordinary call. Namely, when the NW 1 processes the quasi-outgoing call normally and terminates the quasi-call at the destination trunk, the NW 1 is judged to be operating normally. However, if the NW 1 cannot terminate the outgoing call at the destination trunk, it is judged as operating abnormally.

If an abnormality is detected by this monitoring, the ESE 3 deems that the operation of the software system of the CPR 2 is abnormal. Then, an emergency action signal (called an EMA hereinafter) 6 is transmitted from the ESE 3 to the CPR 2 and the software system of the CPR 2 is initialized based on the EMA 6, and is thereby restored to its normal operation state.

FIG. 2 (PRIOR ART) shows another example of an apparatus for monitoring the CPR 2, using a conventional ESE. Each of a plurality of NWs 1 has a corresponding ESEs 3 and a plurality of CPRs 2 are connected to respective NWs 1. The CPRs 2 are connected to a main processor (called an MPR hereinafter) 7 for managing the communication process.

In the above recited multiprocessor system, when all the CPRs 2 simultaneously become abnormal, the MPR 7 is judged to be operating abnormally based on the monitoring of respective ESEs 3. Then, the software system of the MPR 7 is initialized, thereby enabling the monitor to determine whether or not the incoming call from an external apparatus is normal.

Various signaling methods are provided for use in telephone networks. No. 1 to No. 7 and R1 and R2 signaling methods are known as standard signaling methods recommended by CCITT (international telephone telegram consulting committee) in international lines. No. 6 and No. 7 signaling methods utilize a new data transmission technology and a common channel signaling method (called CCS hereinafter) in which various control signals are transmitted by a transmission line different from a message communication line.

No. 7 signaling system can not only be used in telephone systems but can also be expanded for use in ISDNs (Integrated Service Digital Networks). It has a data transmission rate of 64 k bit per second (digital signals) and 4.8 k bit per second (analog signals). Signal units used by the No. 7 signaling system do not have fixed lengths and have a larger line identification capacity than the No. 6 signaling system. Therefore, the No. 7 signaling system has been widely adopted.

The actual format of the above described CCS includes a corresponding network structure and a non-corresponding network structure. The corresponding network structure corresponds to the message communication lines among the exchanges on a one-by-one basis. The non-corresponding network structure forms a communication network independent of the message communication line and provides a signal transfer point (STP), thereby including an exchange as a communication terminal.

An intelligent network is provided for providing a high-quality telephone service. It comprises a service switching point (SSP) for performing an actual connection process and a service control point (SCP) for controlling the SSP. The SCP does not perform the connection processing, but stores the data necessary for the services in the data base and provides the necessary information in accordance with the request sent from the SSP by using the No. 7 signaling system.

The signaling processor (called SPR hereinafter) utilized in the above STP and SCP does not perform an ordinary calling processing. Therefore, it cannot confirm the normality of the software for a communication receipt by using the calling processing function of the external monitor of ESE3, as explained with reference to FIGS. 1 and 2.

To clarify this problem, the STP in the CCS system is explained by referring to FIG. 3. The network NW 1 shown in FIG. 3 is exclusive of the signal processing and is different from the NW 1 shown in FIGS. 1 and 2. In FIG. 3, it is connected to data transmission apparatus (DT) 13 through the No. 7 link.

A plurality of networks 1a ... are connected to SPR 8 . .. and SPR 8a ..., which perform a signal processing for a destination signal and do not perform a calling processing through the common channel signaling equipment (called CSE hereinafter) 9 and CSE interface (called CSEI hereinafter) 10.

The above recited SPR 8 and 8a are connected to a plurality of nodes (NODE) 11 which are connected to a local area network (called LAN hereinafter) and the node 11a is connected to the MPR 7. The MPR 7 is connected to the alarm shelf (called ALMSH hereinafter) 14.

In the STP with the above recited structure, the No. 7 signaling is supplied to the network 1a through the DT 13 and its destination is decoded in the CSEI 10 and the CSE 9. Then, it is transmitted to node 11a through the SPR 8, the respective node 11 . . . and the LAN 12 and further transmitted to the MPR 7. Thereafter, it is returned to the originating network 1a.

In the above recited STP, respective SPRs 8 . . . only perform a signal processing according to the No. 7 signaling system and do not perform a calling processing like the CPR 2 shown in FIGS. 1 and 2. Therefore, the external apparatus cannot monitor the call by using the ESE 3.

Further, as shown in FIG. 3, the SPR designated by 8a among a plurality of SPRs 8, is not directly connected to the network 1a and therefore the ESE 3 cannot be physically connected thereto.

SUMMARY OF THE INVENTION

The present invention is an external apparatus for monitoring a communication system in which an external monitoring can be performed on a system such as an STP or an SCP.

A feature of the present invention resides in an external monitoring apparatus in a communication system which has a configuration comprising a common line signaling unit for separating a telecommunication function from a data communication function and transmitting a data communication signal through an exclusive line, a communication processing unit for processing the communication using the common line signaling unit, and an alarm processing unit for raising an alarm when an abnormal condition has arisen in the communication associated with the common line signal processing unit. The alarm processing unit comprises external communication monitoring means for monitoring an abnormal condition in communication control by the communication processing means.

DETAILED DESCRIPTION OF THE PREFERRED EMBODIMENTS

Figure 4:
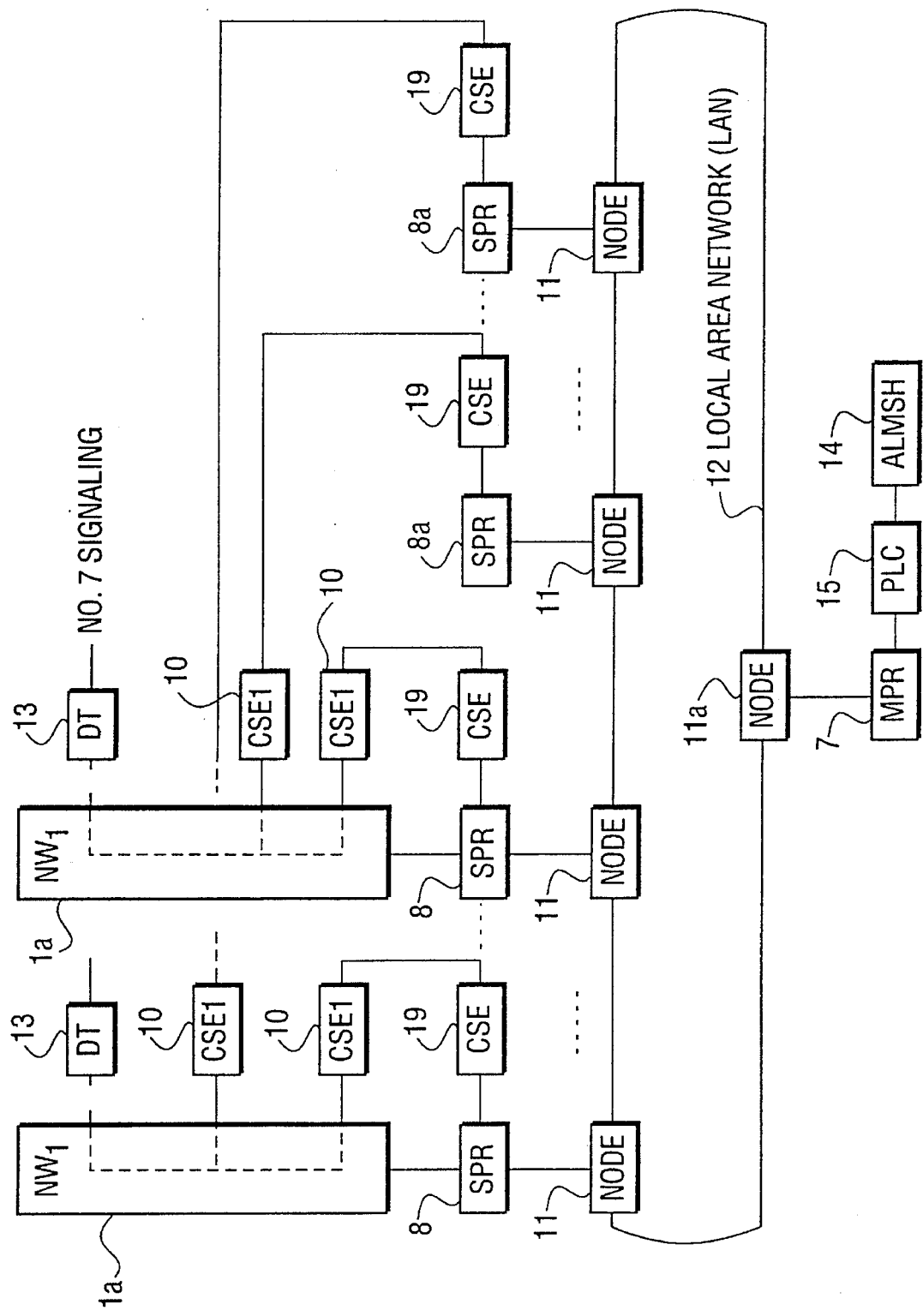
FIG. 4 shows the configuration of the signal intervention station of an embodiment of the present invention.
Figure 5:
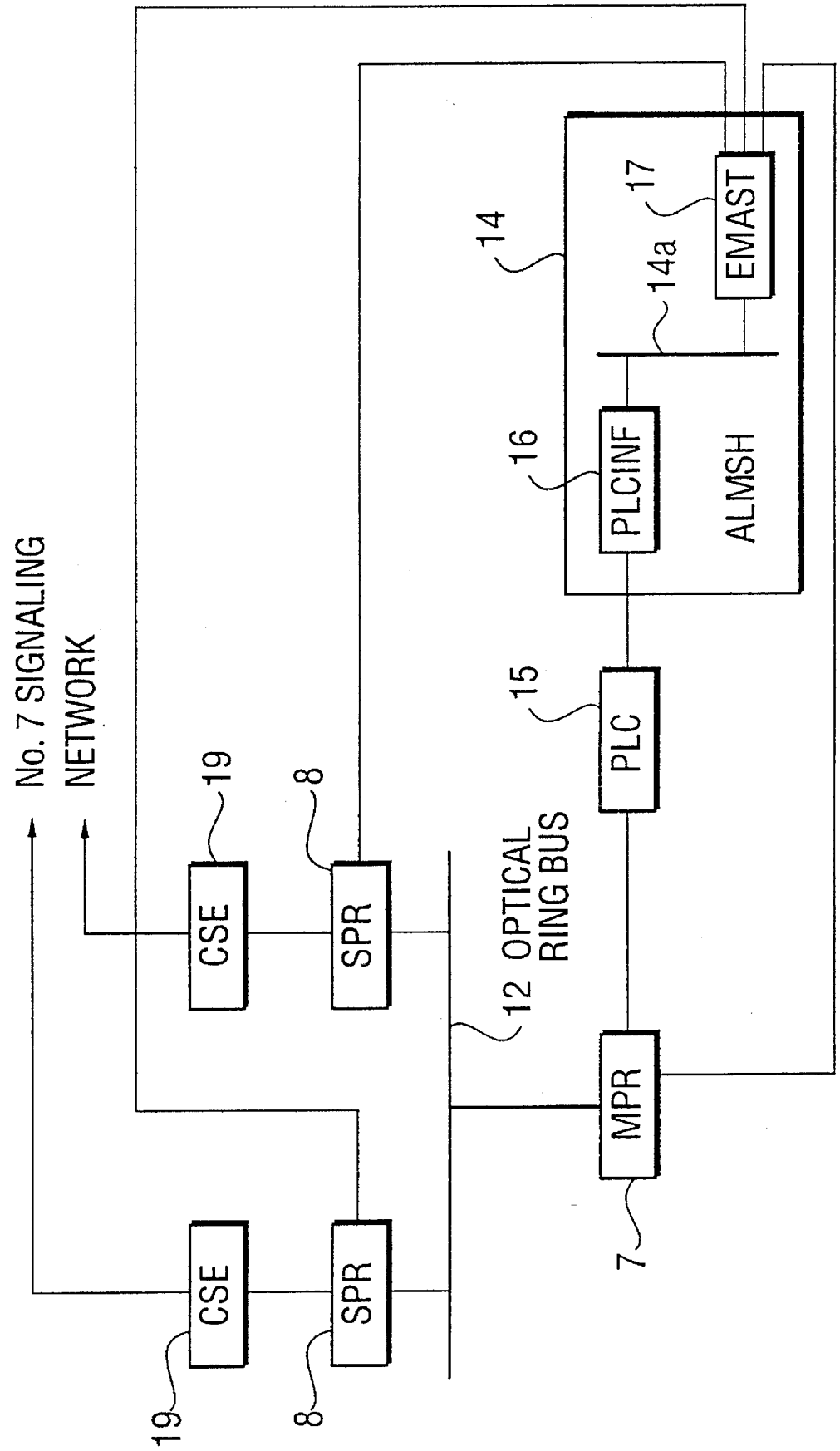
FIG. 5 shows the configuration of an embodiment of the external monitoring apparatus in the communication system related to the present invention.

An embodiment of the present invention is explained by referring to FIGS. 4 and 5.

The communication system of the present invention is shown in FIG. 4 and the structure of the external monitoring apparatus is shown in FIG. 5. Like reference numbers designate like portions in the prior art and the present invention. A common channel signaling processing means 19 separates the function of the talking or message communication from the usual communication and transmits the communication signal by an exclusive or leased line, and performs a loop back of a test signal. A communication processing means 8 executes a communication process for the common channel processing means 19. An alarm shelf means 14 produces an alarm when the communication of the common channel signaling processing means 19 is abnormal. As shown in FIG. 5, a communication external monitoring means 17 is provided to the alarm shelf means 14 so that it can externally monitor an abnormality of the communication software of the communication processing means 8.

In the communication system of the present invention, the CSE 19 provides a function of a loop back of a test signal for the conventional CSE 9. When the communication external monitoring means 17 of the ALMSH 14 transmits a packet requesting a test to the SPR 8 through the PLC 15, the MPR 7, and nodes 11a and 11, the SPR 8 transmits the test signal to the CSE 19. Then the CSE 19 performs a loop back of the test signal. The SPR 8 confirms the normal operation based on the looped-back signal and reports the result to the communication external monitoring means 17 as the test result data. When this report is not produced, the communication external monitoring means 17 transmits an interruption signal to the SPR 8 for initialization. Therefore, the STP can also be subjected to the external monitor.

The test which uses a quasi-call in the prior art cannot be performed by the CSE 9 which does not conduct a calling processing. In contrast, the present invention provides a CSE 19 capable of performing a loop back operation and the external monitoring means 14 can detect the abnormality by means of the above test using the quasi-signal processing. Even if the external monitoring means 14 is not directly connected to the network, it can manage or control the abnormality.

According to the following explanation, the external monitoring apparatus of the communication system related to the present invention is applied to the STP, and signal No. 7 is processed appropriately as shown in FIGS. 4 and 5. In FIG. 5, nodes in the network are skipped. The CSE 19 is connected to the network 1a for which signal No. 7 is provided. The CSE 19 normally decodes signal No. 7 and has a decoding signal processed by the SPR 8. In this embodiment, the CSE 9 has a looping-back function. The looping-back function is executed by the CSE 9's built-in microcomputer using applicable software after determining the state of a predetermined test request signal. The looping-back function can also be executed based on a hardware configuration without a microcomputer process.

A plurality of SPRs 8 are connected to each node 11 through the LAN, and the node 11a is connected to the MPR 7. The MPR 7 controls the communication among a plurality of the SPRs 8 and manages shared data, etc.

The MPR 7 is connected to a packet controller (referred to as a PLC in the attached drawings) 15. The PLC 15 is connected to the external communication monitoring apparatus (referred to as EMAST in the attached drawings) 17 through a packet controller interface (hereinafter referred to as PLCINF) 16. The PLCINF 16 and the EMAST 17 form an alarm processor (ALMSH) 14. The EMAST 17 is provided in the present embodiment.

The EMAST 17 exchanges information in a packet with the MPR 7 through the PLC 15. The PLCINF 16 is an interface circuit provided in this system.

The output of the EMAST 17 is connected to a plurality of SPRs 8 and a unit of the MPR 7.

Figure 6:
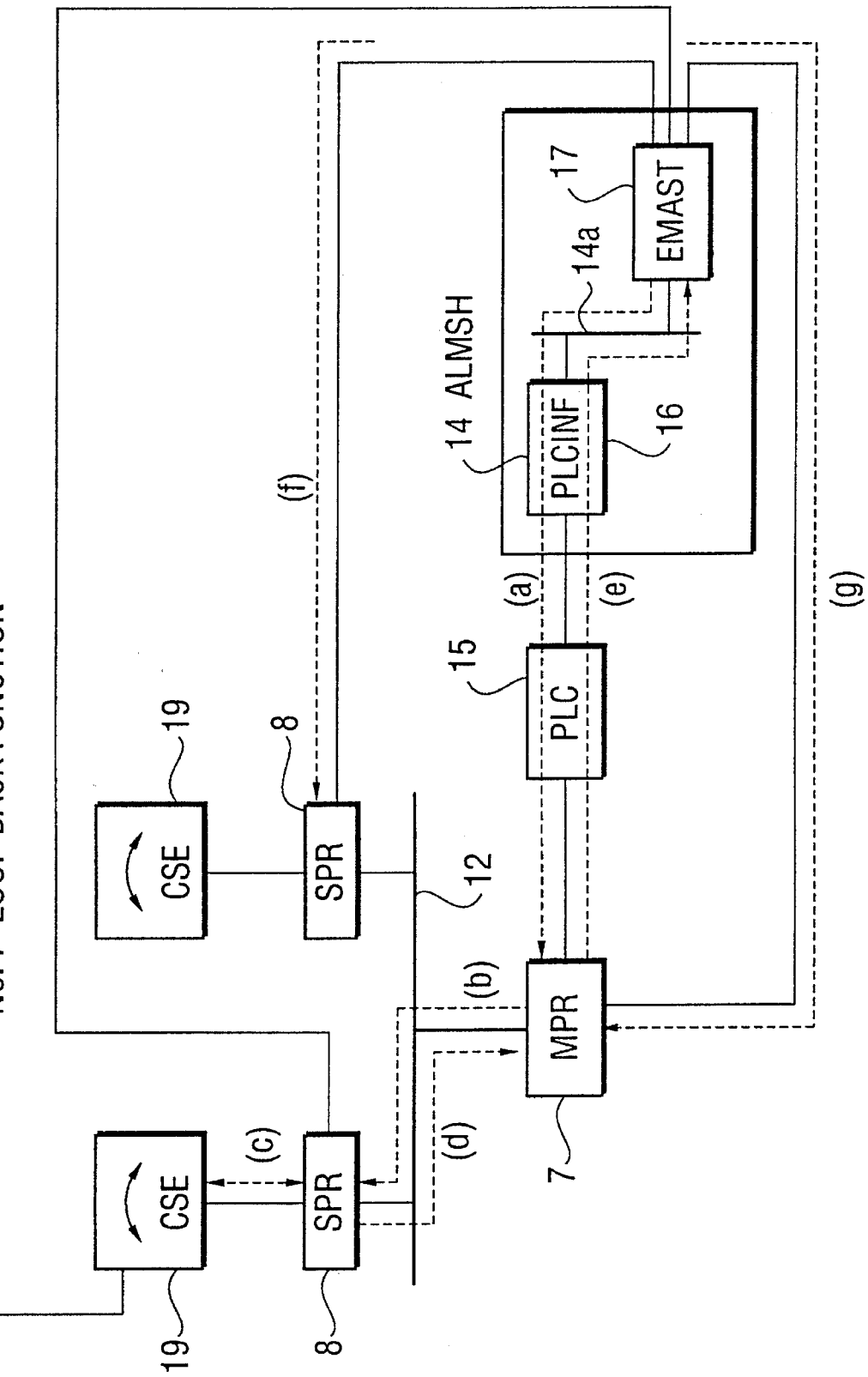
FIG. 6 is an operational view of the external monitoring apparatus in the communication system of the present invention.
Figure 7:
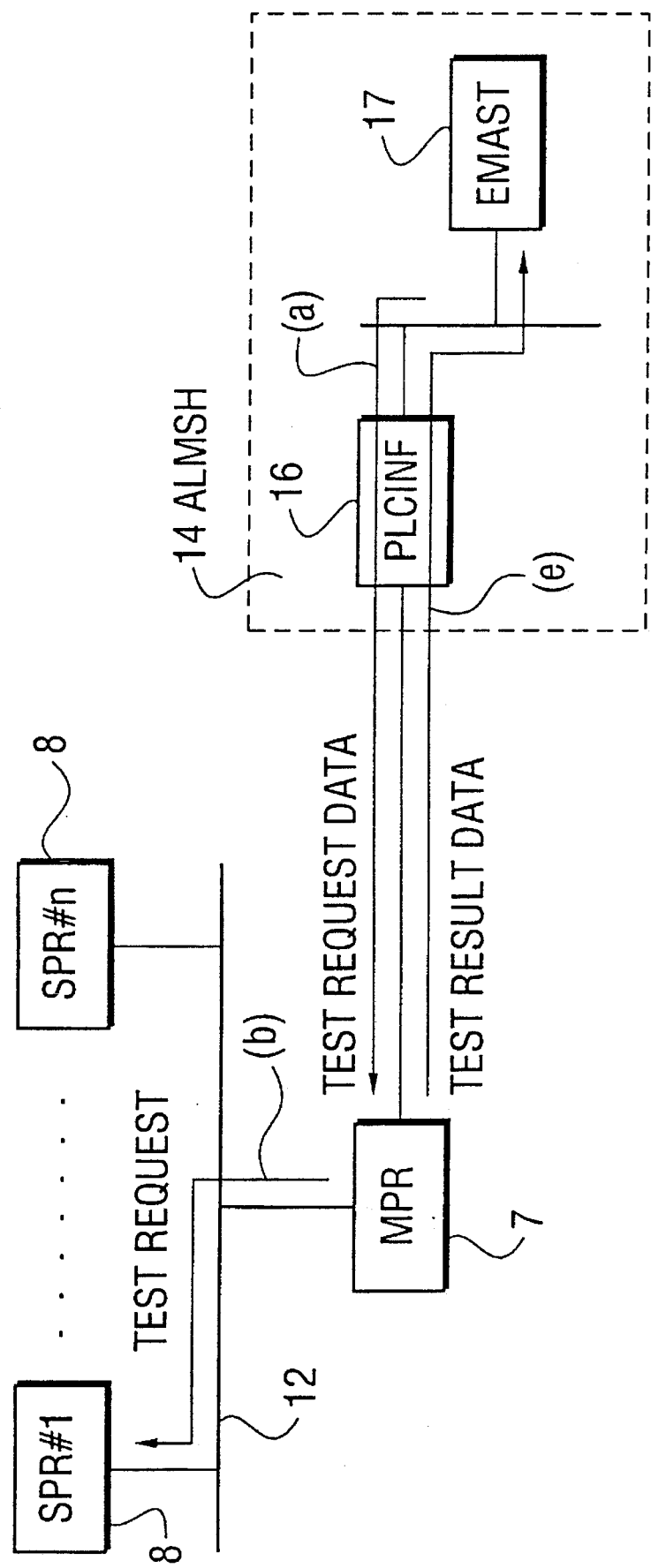
FIG. 7 is a view for explaining the monitoring method of the external monitoring apparatus in the communication system of the present invention.
Figure 8:
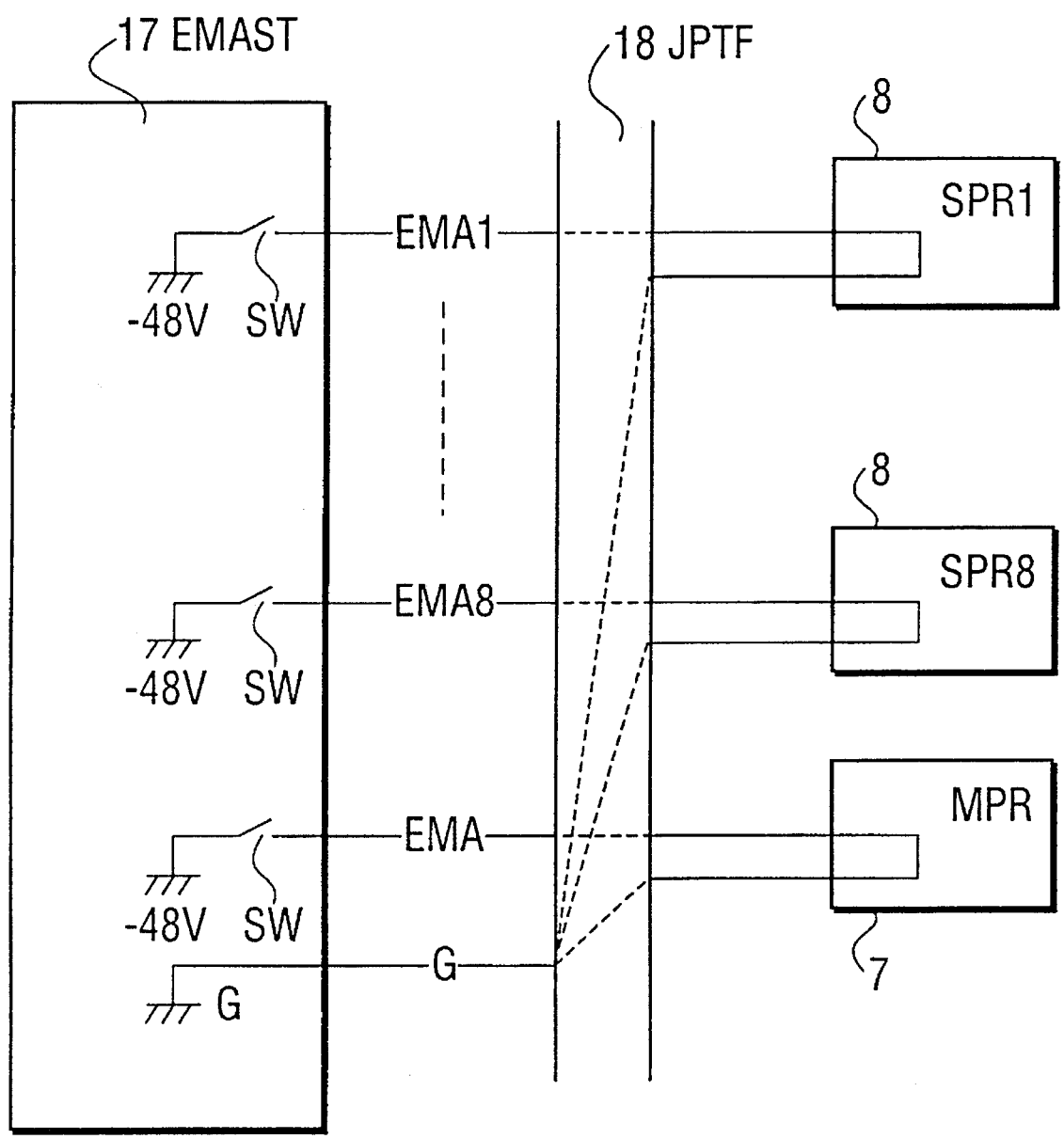
FIG. 8 is a view for explaining the emergent interrupt signaling process of the external monitoring apparatus in the communication system of the present invention.

The operation of the present embodiment with the above configuration is described below by referring to FIGS. 6–8. FIGS. 6 and 7 are for explaining the operation, and FIG. 8 is for explaining the process of the EMA.

Figure 1:
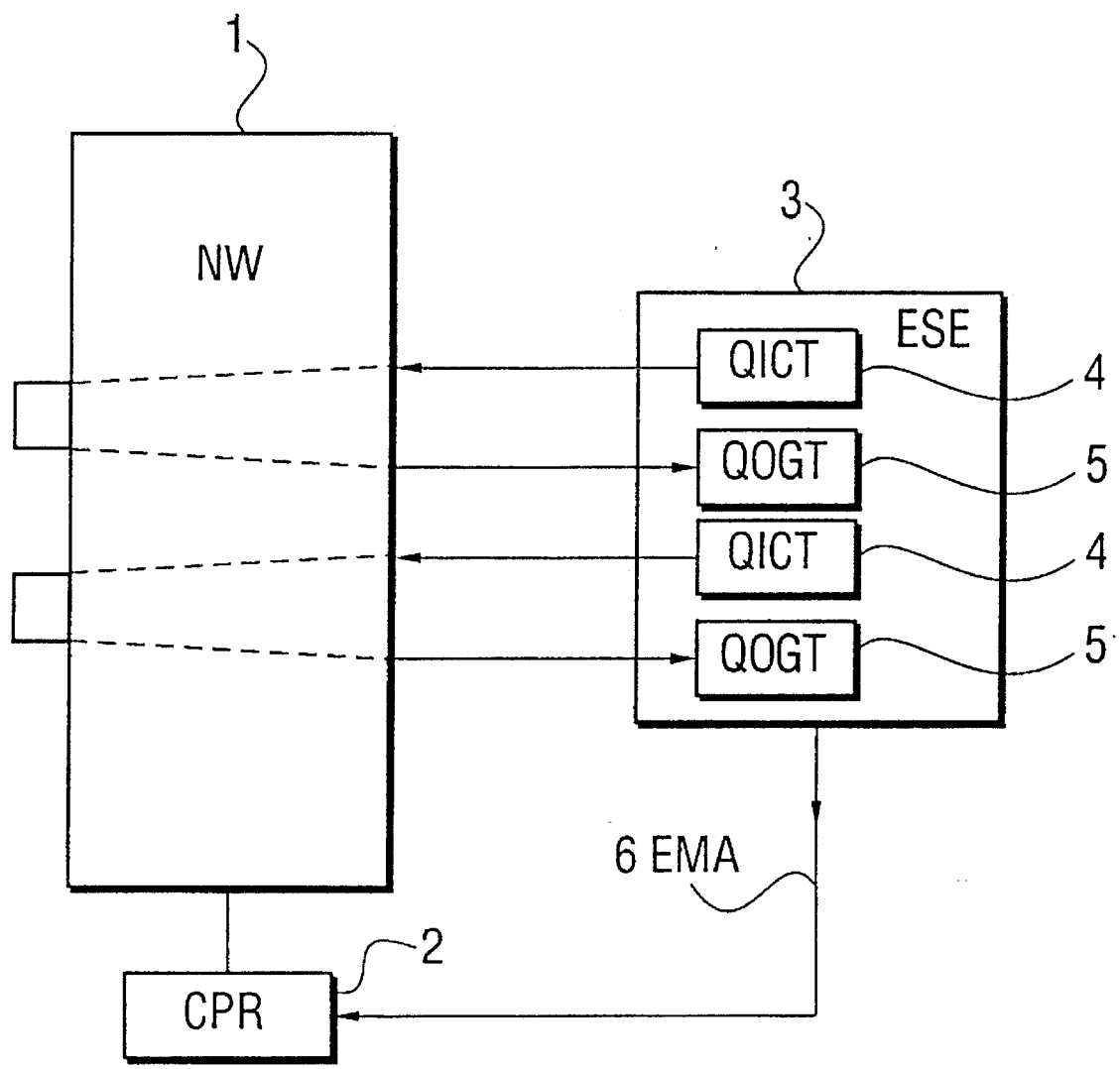
FIG. 1 (PRIOR ART) shows the configuration of the prior art technology.
Figure 2:
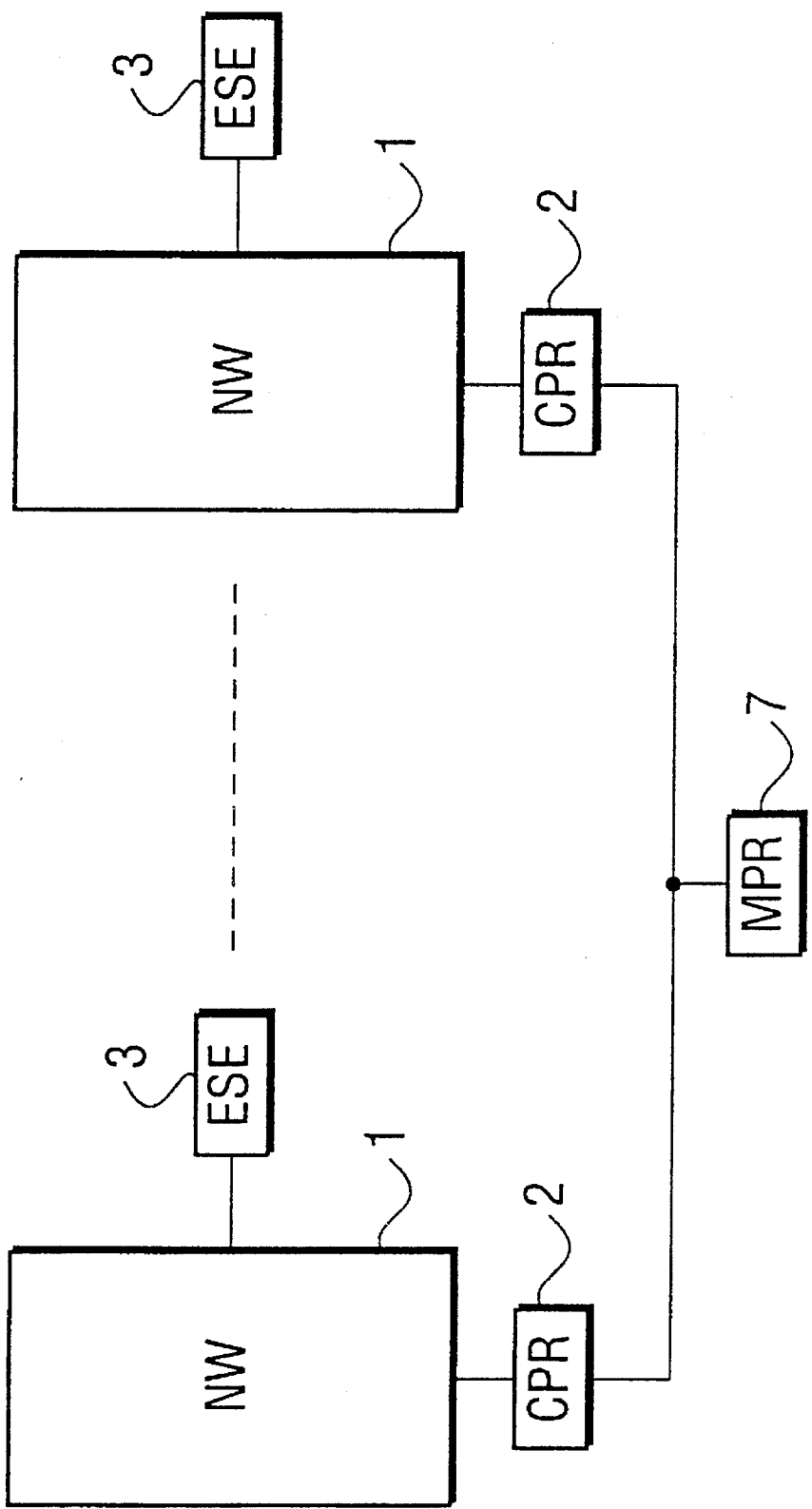
FIG. 2 shows the configuration of the external monitoring apparatus operated in the conventional multiprocessor method.
Figure 3:
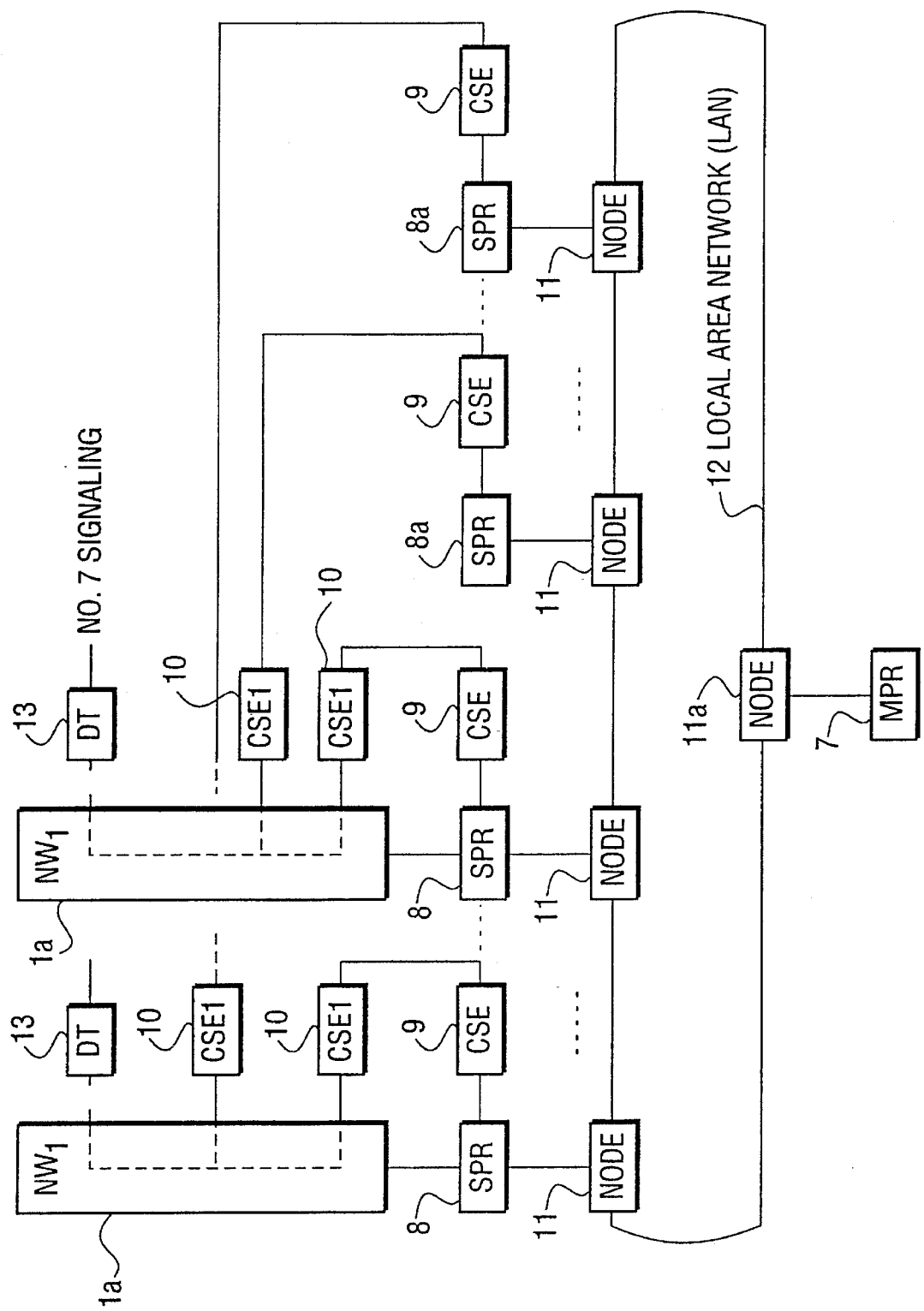
FIG. 3 shows the configuration of the signal relay or intervention station of the present invention.

In FIGS. 6 and 7, conventional parts are assigned the same numbers as those in FIGS. 1 and 2.

The EMAST 17 starts monitoring at the interrupt of a timer (not shown in the drawings), and issues test request data to the MPR 7 through the path indicated by broken line (a) in FIGS. 6 and 7.

On receiving the test request data, the MPR 7 sends a test request signal No. 7 for a link test to an SPR 8 specified by the EMAST 17 (for example, SPR #1 in SPRs #1–#n shown in FIG. 7) as indicated by broken line (b) in FIGS. 6 and 7.

On receiving a test request, the SPR 8 requests a CSE 19 for a loop test as indicated by the path of broken line (c) in FIG. 6. Since the CSE 19 has the function of looping signal No. 7, a test signal sent to the CSE 19 is looped back by the CSE 19. It is then determined whether or not the looped-back signal is successfully received by the SPR 8. Thus, it can be determined whether or not the SPR 8 retains a function of processing signal No. 7 in a state other than that of testing operations at the system installation, etc.

The SPR 8 sends test results to the MPR 7 through the path indicated by broken line (d) in FIG. 6. Then, the MPR 7 sends the test results to the EMAST 17 through the PLC 15, PLCINE 16, and the bus 14a in the path indicated by broken line (e) in FIGS. 6 and 7.

If the test result indicates an abnormal condition according to the looped-back test signal after repeating the series of operations two or three times at predetermined intervals, and if the test result is not returned by the SPR 8 or the MPR 7, the SPR 8 is determined to be in an abnormal condition, and the EMAST 17 performs the following operation.

The EMAST 17 sends an emergent interrupt signal EMA to the SPR 8 which is determined to be abnormal through the path indicated by broken line (f) in FIG. 7. The SPR 8 initializes the software for restarting the process by sending the EMA activation (output of –48 V level) as shown in FIG. 8 with the switch SW in the EMAST 17 turned ON as shown in FIG. 8. –48 V means the voltage of the system power source. The connection state of the power source (ON/OFF) is informed to the logical circuit of the SPR 8 by a logical signal I/O. The information causes an interrupt to or a reset of a processor, and the processor takes the necessary action according to the information.

The ALMSH 14 includes a processor system, and the EMAST 17 is connected to the bus of the processor system. The processor system is provided with a timer for applying an interrupt to the processor in a specific time unit in order to instruct the EMAST 17 to execute a monitoring operation. According to the instruction, the EMAST 17 starts a monitoring operation. The EMAST 17 can be an exclusive circuit or a program to be executed by the processor.

When all the SPRs 8 including SPR #1–#n indicate an abnormal condition or when no response is returned from the MPR 7, the MPR 7 initializes the software after receiving an EMA through the path indicated by broken line (g) in FIG. 6. That is, as shown in FIG. 8, an EMA activation (output of –48 V level) is performed on the MPR 7 through the SW in the EMAST 17. The EMA activation described above, that is, the EMA loopback signal line, is grounded through a jumper frame 18.

All the connections to the EMA activation, test circuits, etc. are performed through the jumper frame JPIF which enables a connection according to a change in a condition (such as the location of a system) specific to a target line. The connection is normally made by wrapping.

In the above described embodiment, the STP is explained as being used for signal No. 7. However, in the present invention, it is obvious that the STP can be applied to other methods such as for processing No. 6 signaling used for a common line signaling process. It can also be used for the SCP, etc., capable of processing No. 7 signaling.

In the embodiment of the present invention, the system is provided with the MPR 7, but it is not limited to this configuration. For example, with a system having one CPR or CSE, an external communication monitoring apparatus directly sends a test request.

Thus, the present invention enables an external monitoring operation at the STP and SCP at which external monitoring control cannot be performed with the prior art technology.

Therefore, the present invention enables an external monitoring operation for a signaling processor which does not process a call using a CCS exclusively used for a signal or perform a message communication and a signaling operations separately.

What is claimed is:

1. An external monitoring system operating for a communication system comprising:

common channel signaling means for separating a message communication function from a communication function and for transmitting and receiving a call control message signal through a signaling channel separate from speech channels;

signal processing means, connected to said common channel signaling means, for controlling a communication process for said common channel signaling means; and alarm processing means, connected to said signal processing means, for testing whether said communication controlled by said signal processing means is abnormal by sending said signal processing means a test request for determining whether said controlled communication is abnormal, said signal processing means further sending a test signal to said common channel signaling means in response to said test request and said common channel signaling means further looping back said test signal to said signal processing means, said signal processing means further confirming the loop backed test signal and then notifying said alarm processing means of a confirmation result, said alarm processing means thereby determining whether said controlled communication is abnormal in accordance with the confirmation result, and said alarm processing means recovering from an abnormal condition when said controlled communication is determined to be abnormal.

2. An external monitoring system according to claim 1, wherein said common channel signaling means loops back said test signal at a request of said alarm processing means to start a monitoring operation.

3. An external monitoring system according to claim 1, wherein said alarm processing means further provides an emergent interrupt signal to said signal processing means to initialize said signal processing means when said communication controlled by said signal processing means is determined to be abnormal.

4. An external monitoring system comprising:

a plurality of common channel signaling means for transmitting and receiving a call control message signal through a signaling channel separate from speech channels;

a plurality of signal processing means, connected to said plurality of common channel signaling means, for performing a communication process for said plurality of common channel signaling means;

main controlling means, connected to said plurality of signal processing means, for controlling said plurality of signal processing means; and alarm processing means, connected to said main controlling means, for testing whether said plurality of signal processing means controlled by said main controlling means are abnormal by sending test request data to said main controlling means which then sends a test request signal to said plurality of signal processing means to determine whether said performed communication process is abnormal, said plurality of signal processing means then further sending a test signal to said plurality of common channel signal means in response to said test request signal, said plurality of common channel signaling means then further looping back said test signal to said plurality of signal processing means, said plurality of signal processing means further confirming the looped back test signal and then notifying said alarm processing means of a confirmed result through said main controlling means, said alarm processing means thereby determining whether said communication process performed by any of said plurality of signal processing means is abnormal in accordance with the confirmation result, said alarm processing means further generating an alarm signal and recovering from an abnormal condition when said communication process is determined to be abnormal.

5. An external monitoring system according to claim 4, wherein said plurality of said common channel signaling means loop back said test signal at a request of said alarm processing means to start a monitoring operation.

6. An external monitoring system according to claim 5, wherein said plurality of common channel signal processing means perform data communication according to a No. 7 signaling system.

7. An external monitoring system according to claim 4, wherein said alarm processing means further initializes said main controlling means by generating an interrupt signal when said main controlling means notifies a no confirmation of the loopback at said signal processing means.

8. An external monitoring system according to claim 7, wherein said initialization indicates a hardware reset of said signal processing means.

9. An external monitoring system according to claim 4, wherein said alarm processing means further initializes said signal processing means by generating an emergent interrupt signal when the loopback test signal is not confirmed by said signal processing means.

* * * * *